United States Patent Office 3,262,800
Patented July 26, 1966

3,262,800
ASPHALTIC PAINT COMPOSITION
Everett Baxter, deceased, late of Oklahoma City, Okla., by Nina W. Baxter, administratrix, 1612 N. Ellison, Oklahoma City 6, Okla.
No Drawing. Filed Sept. 1, 1961, Ser. No. 135,455
9 Claims. (Cl. 106—235)

This invention relates to liquid coating compositions and more specifically to a paint and method of producing the same. The paint is especially useful as a so-called street surface marking paint but has other applications where a smooth-flowing, ready levelling, liquid-repellent, quick-drying, easily-seen paint, having excellent adhesion and flexibility, with substantially no peeling, chipping or crazing, is desired. Such other applications include those to metals and concrete floors or other concrete surfaces. The present application is a continuation-in-part of application Serial Number 767,760, filed October 17, 1958, for Asphaltic Paint and Method of Manufacturing Thereof, now abandoned.

An important object of the invention is to provide a paint which may be applied by brush, spraying equipment and rollers or the like to various surfaces, including pavements, curbing, hard-surfaced sidewalls and the like, and will flow freely and level especially evenly and readily.

Another important object is to provide a paint which is water-repellent both when the paint is wet and dry and is repellent to the common greases and oils which drop upon pavements.

Since it is generally important that street surface marking paint dry quickly so that it will not be carried by vehicle wheels to areas outside the paint-coated areas, an important object of this invention is to provide a paint which dries to touch in one hour and dries hard in eight hours.

A further important object of the invention is to provide a paint which has especially good visibility in the daylight as well as under artificial light at night, even on pavements of light grey surfacing for example. The film surface of the coated paint is somewhat rough which is desirable in street surface-marking paint.

Additionally, an important object is to provide a paint which, while adhering tenaciously to a surface, as that of pavement, will not peel, chip nor craze even with the poundings and the changes in temperature to which pavements and the like are subjected.

A further object is to provide a paint which may be manufactured and sold at moderate cost.

In addition, an important object is to provide a method for the manufacture of the paint of this invention.

Other objects and advantages of the invention will be apparent during the course of the following detailed description of the invention.

Broadly, the novel paint of this invention comprises an asphalt-containing compound or composition, a thinner therefor, silica powder, white lead pigment, shellac and, zinc oxide, admixed with a conventional paint. Examples of these will be more fully described later in this specification.

The preferred asphalt-containing compounds or compositions are: (A) one consisting of non-volatile ingredients, substantially 42.0%, and volatile ingredient, substantially 58.0%. The non-volatile ingredients preferably consist of asphaltum, substantially 51.0%, gilsonite, substantially 41.0%, and rosin substantially 8.0%. The volatile ingredient is preferably naphtha, substantially 58.0% of the total volatile and non-volatile ingredients. (B) one consisting of non-volatile ingredients, substantially 43.0%, and volatile ingredients, substantially 57.0%. The non-volatile ingredients preferably consist of blown asphaltum, gilsonite and rosin, in substantially the same percentages as in (A), and the volatile ingredients consist of a mixture of mineral spirits and naphtha. (C) one consisting of: non-volatile matter, 70% min., organic asphalts or asphalt blends, 50% min., mineral matter-asbestos fiber, 15% min., mineral stabilizer, 10–20%, and volatile matter-mineral spirits or naphtha, 30% max. The base asphalt binder in (C) is a refined residuum stock. The residuum is processed by steam reduction followed by a light air blowing to the proper characteristic. The type of asbestos fiber used is chrysotile. The inert mineral stabilizer is finely pulverized silica. This is a crystalline inert mineral which is not affected by heat. The volatile petroleum solvent consists of straight run distilled spirits which can be described as having a boiling range of approximately 300° F. initial boiling point approximately 400° F. dry point, and a minimum kauri-butanol value of 37. These solvents can be described as being generally aliphatic or straight chain hydrocarbons.

The thinner for the asphalt-containing compound or composition is preferably the following:

(A) An alcohol portion consisting of isopropyl alcohol, a ketone mixture portion of acetone, methyl ethyl ketone and di-isobutyl ketone, an ester portion of a mixture of methyl amyl acetate and Cellosolve acetate, and a petroleum hydrocarbon portion of a mixture of aliphatic and aromatic hydrocarbons derived from the distillation of crude oil, this thinner being known as DuPont Duco Lacquer Thinner 3661.

Other thinners, by way of example, which may be used are as follows:

THINNER B

| | Total percent |
|---|---|
| Amyl acetate 5%; ethyl acetate 3% | 8 |
| Alcohols: Butyl 12%; ethyl 5%; methyl 3% | 20 |
| Methyl-ethyl ketone | 17 |
| Toluol | 37 |
| Petroleum naphtha | 18 |
| | 100 |

THINNER C

| | |
|---|---|
| Butyl acetate 9%; ethyl acetate 11% | 20 |
| Alcohols: Butyl 5%; ethyl 8% | 13 |
| Toluol | 67 |
| | 100 |

THINNER D

| | |
|---|---|
| Butyl acetate | 20 |
| Alcohols: Butyl 10%; ethyl 5% | 15 |
| Toluol | 65 |
| | 100 |

THINNER E

| | |
|---|---|
| Butyl acetate | 15 |
| Butyl alcohol | 15 |
| Toluene | 70 |
| | 100 |

The above percentages being by weight.

The silica powder is preferably the ordinary, substantially white, tasteless silicon dioxide powder, with specific gravity between 2.2–2.6.

The white lead pigment is preferably white lead (dry), i.e., basic lead carbonate and/or basic lead sulfate, and will be referred to, as to use, later in this specification.

Preferably, the shellac is the 100% pure, clear, white shellac. The four-pound cut is preferred.

The zinc oxide is ordinary, substantially white zinc oxide.

The preferred conventional paint (A), where a novel white paint of this invention is desired, consists of the following: pigment, by weight 65.4%, and vehicle, substantially 34.6% by weight. The pigment, by weight, consisting of preferably the following:

| | Percent |
|---|---|
| Leaded zinc oxide (basic sulfate white lead 24.5% and zinc oxide 33.0%) | 57.5 |
| Titanium dioxide | 15.0 |
| Asbestine (magnesium silicate) | 27.5 |
| | 100 |

The above-mentioned vehicle preferably consists of:

| | Percent |
|---|---|
| Raw linseed oil | 41.0 |
| Heat-treated linseed oil | 27.5 |
| Drier (mineral spirits) | 31.5 |
| | 100 |

A second conventional paint, for example, is as follows:

*Paint B (green)*

| | Percent by weight |
|---|---|
| Titanium calcium pigment | 15.4 |
| C.P. chrome yellow | 1.3 |
| Titanium dioxide | 1.6 |
| Phthalocyanine green | 0.6 |
| Soya alkyd resin | 28.3 |
| Maleic ester resin | 10.0 |
| Aliphatic and aromatic hydro-carbons | 40.3 |
| Driers | 2.5 |
| Tinting colors added—less than 5% of above total | |
| | 100.0 |

A third conventional paint given by way of example, consists of:

*Paint C (yellow)*

| | Percent by weight |
|---|---|
| Titanium calcium pigment | 14.5 |
| Titanium dioxide | 9.1 |
| C.P. chrome yellow | 13.4 |
| Maleic resin-linseed oil | 28.6 |
| Mineral spirits | 30.4 |
| Drier | 4.0 |
| Tinting colors added—less than 5% of above total | |
| | 100.0 |

As a further example (Paint D) of a conventional paint addition, is as follows, although the paint A is preferred, contains substantially 60.5% pigment and 39.5% vehicle, and comprises:

| | Percent |
|---|---|
| Titanium calcium pigment | 31.5 |
| Zinc sulphide | 17.0 |
| Calcium carbonate | 8.6 |
| Asbestine | 3.5 |
| Linseed oil | 7.3 |
| Varnish | 13.4 |
| Drier and mineral spirits | 18.7 |
| | 100.0 |

The above percentages are by weight, the varnish consists of fixed fatty oils, 42.0%; resins, 13.0%, and mineral spirits, 45%, and the paint is tinted with umber and iron oxide. This paint is commonly known as a beige flat wall paint.

The preferred formula of this invention is:

FORMULA A

| | Percent by weight |
|---|---|
| Asphalt-containing composition | 2.481 |
| Thinner | 1.975 |
| Silica powder | 1.885 |
| White lead pigment (first addition) | 10.016 |
| Shellac | 8.745 |
| Zinc oxide | 2.116 |
| White lead pigment (second addition) | 6.010 |
| Conventional paint | 66.772 |
| | 100.000 |

In round figures, Formula A may be expressed as follows:

| Item No. | Formula A | Percent by Weight |
|---|---|---|
| 1 | Asphalt-containing composition | 2.5 |
| 2 | Thinner | 2.0 |
| 3 | Silica powder | 2.0 |
| 4 | White lead pigment (first addition) | 10.0 |
| 5 | White shellac | 8.5 |
| 6 | Zinc oxide | 2.0 |
| 7 | White lead pigment (second addition) | 6.0 |
| 8 | Conventional paint | 67.0 |
| Total | | 100.0 |

A general formula for the novel paint of this invention is:

| | Percent |
|---|---|
| Asphalt-containing composition | 1 to 5 |
| Thinner | 1 to 5 |
| Silica powder | 1 to 10 |
| White lead pigment (first addition) | 5 to 15 |
| Shellac | 3 to 10 |
| Zinc oxide | 0 to 5 |
| White lead pigment (second addition) | 1 to 10 |
| Conventional paint | 50 to 75 |

The last above percentages are by weight.

Common to the novel paint formulae is a very large percentage of conventional paint which is generally regarded as not suitable, by itself, for application to asphalt, coal-tar and concrete pavements subjected to vehicular traffic. A street-marking paint, when so applied, must have good wearing, water and grease repelling, adhesive and flexibility characteristics and be quick drying. The novel paints of this invention dry to the touch in substantially one hour and dry hard in substantially eight hours. Ordinary paints even so-called outside enamels, machinery enamels, industrial enamels and the like, by themselves, are not adapted for use as so-called street-marking paints which are subjected to the poundings of modern vehicular traffic.

Adhesion tests were made of the novel paints of this invention by the method set out in Federal specifications, in which the paint to be tested is applied to tinplate panels and allowed to dry, after which the films are cut through with a razor blade and pieces of gummed cellulose tape are applied across the cuts and pressed down firmly. The tapes are then pulled free by pulling at right angles to the panels, and the amount of paint film removed is a measure of the adhesion. All of the paint films of Formula A withstood the test without any peeling whatever. The test was repeated with a masking tape having stronger adhesion to the paint; this test also failed to produce any film removal.

Flexibility tests were made by the method specified in Federal Specification TT–P–141b, Method 622.1. In this method, the paint is applied to 31 gage tinplate and allowed to dry, after which the tinplate panel is bent rapidly around a mandrel, paint side out, and the paint film is examined with a lens for cracks.

The paint films of Formula A withstood bending around a ⅛-inch mandrel. The bent panels were then flattened in a press until cracking of the paint film occurred. It was found that all the panels withstood bending until the outside diameter of the bend was reduced to 0.05 inch and that all the paints cracked at that diameter. The cracked films did not flake appreciably.

In addition to the laboratory tests described, field tests were made of the novel paints. The paints are adapted for use, including the use of the paints as coatings applied directly to asphalt substrates, concrete substrates and coal-tar substrates and not only are they useful as street surface marking paints but also as paints for application to concrete, asphalt and coal-tar floors or allied supports. They are also useful for surface coatings of machinery, farm implements, railroad equipment, shipbuilding and as primers.

The steps in the method of producing the novel paints of this invention are carried out at a room temperature above 32° F. and are as follows: (1) dissolving the asphalt-containing compound or composition in the thinner; (2) introducing the silica powder to the thinned asphalt-containing compound or composition of step (1), and mixing thoroughly as by stirring; (3) introducing the first addition of white lead pigment to the mixture of step (2) and replacing loss of thinner by evaporation by the addition of more thinner, with thorough mixing, as by stirring (4) introducing the shellac to the mixture of step (3) and mixing (as by stirring) thoroughly; (5) introducing the zinc oxide to the mixture of step (4) and mixing (as by stirring) thoroughly; (6) introducing the white lead pigment of the second addition to the mixture of step (5), mixing thoroughly and if necessary, grinding to obtain a substantially complete dispersion and wetting of the white lead and zinc oxide, if needed, alcohol to replace any loss by evaporation of the alcohol content, mixing must be continued until the bath is homogeneous, this provides the composition of matter for admixture with the conventional paint of the next step; (7) the conventional paint is thoroughly stirred; and then (8) the thoroughly stirred conventional paint is introduced to the mixture of step (6) slowly and with continuous mixing together. The resultant mixture is any selected of the novel paints of this invention.

The white lead pigments of the formulae and the method, may be basic lead carbonate or basic lead sulfate, or combinations of the two. For example, a combination of ten parts, by weight, basic lead carbonate and six parts, by weight, basic lead sulfate has been found desirable, where a combination of the two is to be employed.

Generally, it would be thought that the addition of such a large percentage, of the total percentage of the novel paint of this invention, of conventional paints, would not provide a satisfactory paint for surface coating the asphalt, concrete and coal-tar substrates of streets, pavements and sidewalks, but the novel paints of this invention demonstrate that such large percentages may be employed.

By the term "conventional paint" in this specification and/or the claims is meant a surface-coating composition of paint-like consistency, such as the detailed examples given, which is not useful by itself as a so-called street-marking paint, because it is not adapted to take the poundings and abrasions caused by vehicular traffic upon it, useful as it may be in other fields, but which conventional paint may be admixed, in relatively large percentages by weight, for example, with the other ingredients of this invention, and the resulting novel paint capable of application, for example, to surfaces such as asphalt, coal-tar and concrete pavement surfaces subjected to vehicular traffic, from light to heavy, and will not be apt to peel, chip or craze, and which is smooth-flowing, readily leveled, repellent to liquids such as oil and grease encountered on streets, is quick-drying and easily observed by the drivers of vehicles passing upon or over it, and has good adhesion and flexibility characteristics.

What is claimed is:

1. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; blown asphaltum, gilsonite, rosin and naphtha; asphalt, asbestos fibers and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and at least 50% conventional paint of the class containing pigment and non-aqueous organic vehicle, said percentages being by weight.

2. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; brown asphaltum, gilsonite, rosin and naphtha; asphalt, asbestos fibers and naphtha; blown asphaltum and grahamite; and blown asphaltum, grahamite, rosin and naphtha, substantially 2.5%; thinner for the asphaltic mixture substantially 2.0%; silica powder, substantially 2.0%; white lead pigment, substantially 16.0%; shellac, substantially 8.5%; zinc oxide, substantially 2.0%; and conventional paint of the class containing pigment and non-aqueous organic vehicle substantially 67.0%, said percentages being by weight.

3. A surface coating composition characterized by ease in application to surfaces including asphalt, coal-tar and concrete pavements, and having good wearing, water and grease repellent, adhesive and flexibility characteristics and being quick drying, consisting of an asphaltic mixture 1 to 5%, consisting of blown asphaltum, substantially 44.5% by weight and gilsonite, substantially 55.5% by weight, of said asphaltic mixture; thinner for the asphaltic mixture 1 to 5%; silica powder 1 to 10%; white lead pigment 6 to 25%; shellac 3 to 10%; zinc oxide 0 to 5%; and at least 50% conventional paint of the class containing pigment and non-aqueous organic vehicle, said percentages being by weight.

4. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; blown asphaltum, gilsonite, rosin and naphtha; asphalt, asbestos fibers and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and at least 50% conventional paint consisting of pigment, by weight, of the conventional paint substantially 65.4% and non-aqueous organic vehicle, by weight of the conventional paint substantially 34.6%.

5. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; blown asphaltum, gilsonite, rosin and naphtha; asphalt, asbestos fibers and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and conventional paint 50% to 75% consisting of pigment, by weight, of the conventional paint substantially 65.4% and vehicle, by weight of the conventional paint, substantially 34.6%, said pigment consisting of leaded zinc oxide (basic sulfate white lead 24.5% and zinc oxide 33.0%) being substantially 57.5% of total pigment, titanium dioxide substantially 15.0% of total pigment and magnesium silicate substantially 27.5% of total pigment, and said vehicle consisting of raw linseed oil, substantially 41.0% of total vehicle, heat-treated linseed oil substantially 27.0% of total vehicle, and mineral spirits drier, substantially 31.5% of total vehicle, said percentages being by weight.

6. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite, blown asphaltum, gilsonite, rosin and naphtha; asbestos fibers, asphalt and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and conventional paint 50% to 75%, said conventional paint consisting of, by weight, titanium calcium pigment, substantially 15.4%; C.P. Chrome yellow, substantially 1.3%; titanium dioxide, substantially 1.6%; phthalocyanine green, substantially 0.6%; soya alkyd resin, substantially 28.3%; maleic ester resin, substantially 10.0%; mineral spirits, substantially 40.3%; driers, substantially 2.5%; and tinting colors added—less than 5% of above total.

7. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; blown asphaltum, gilsonite, rosin and naphtha; asphalt, asbestos fibers and naphtha; blown asphaltum and grahamite; and blown asphaltum, grahamite, rosen and naphtha, 1 to 5%; thinner for the asphaltic mixture 1 to 5%; silica powder 1 to 10%; white lead pigment 6 to 25%; shellac 3 to 10%; zinc oxide 0 to 5%; and conventional paint 50% to 75%, said conventional paint consisting of, by weight, titanium calcium pigment, substantially 14.5%; titanium dioxide, substantially 9.1%; C.P. Chrome yellow, substantially 13.4%; maleic resin—linseed oil, substantially 28.6%; mineral spirits, substantially 30.4%; drier, substantially 4.0%; and tinting colors added—less than 5% of above total.

8. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of blown asphaltum and gilsonite; blown asphaltum, gilsonite, rosin and naphtha; asphalt, asbestos fibers and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and at least 50% conventional paint of the class containing pigment and non-aqueous organic vehicle, said percentages being by weight.

9. A surface coating composition characterized by ease in application to surfaces including asphalt, coal-tar and concrete pavements, and having good wearing, water and grease repellent, adhesive and flexibility characteristics and being quick drying, consisting of an asphaltic mixture selected from the group consisting of a blown asphaltum and gilsonite; blown asphaltum, gilsonite, rosin and naphtha; asphalt, asbestos fibers and naphtha; blown asphaltum and grahamite; and blown asphaltum, grahamite, rosin and naphtha, 1 to 5%; thinner for the asphaltic mixture 1 to 5%; silica powder 1 to 10%; white lead pigment 6 to 25%; shellac 3 to 10%; zinc oxide 0 to 5%; and conventional paint 50% to 75%, said conventional paint consisting of, by weight, titanium calcium pigment, substantially 31.5%; zinc sulphide, substantially 17.0%; calcium carbonate, substantially 8.6%; asbestine, substantially 3.5%; linseed oil, substantially 7.3%; varnish, substantially 13.4%; and drier and mineral spirits, substantially 18.7%; said varnish consisting of fixed fatty oils, 42.0%; resins, 13.0%; and mineral spirits, 45.0%.

References Cited by the Examiner
UNITED STATES PATENTS

| | | | |
|---|---|---|---|
| 943,670 | 12/1909 | Ellis | 106—14 |
| 1,202,950 | 10/1916 | Workman | 106—14 |
| 1,254,788 | 1/1918 | Flecchia | 106—225 |
| 2,115,425 | 4/1938 | McGrew | 106—14 |
| 2,752,264 | 6/1956 | Pickell | 106—248 |
| 2,877,129 | 5/1959 | Hardman | 106—246 |

ALEXANDER H. BRODMERKEL, *Primary Examiner.*

JOSEPH REBOLD, MORRIS LIEBMAN, *Examiners.*

J. CARSON, J. B. EVANS, *Assistant Examiners.*